United States Patent [19]

Dagenais

[11] 4,384,599
[45] May 24, 1983

[54] SLICING APPARATUS FOR FELLING TREES

[76] Inventor: Joseph E. Dagenais, 3712-17th Ave., Vernon, B.C., Canada

[21] Appl. No.: 63,795

[22] Filed: Aug. 6, 1979

[51] Int. Cl.³ ............................................. A01G 23/08
[52] U.S. Cl. .................................... 144/34 E; 83/928; 144/339
[58] Field of Search ................ 83/928, 600; 144/3 D, 144/34 R, 34 A, 34 E, 309 AC, 336, 339

[56] References Cited

U.S. PATENT DOCUMENTS

| | | | |
|---|---|---|---|
| 3,122,184 | 2/1964 | Larson | 83/600 |
| 3,348,592 | 10/1967 | Winblad et al. | 144/3 D |
| 3,353,575 | 11/1967 | Larson et al. | 144/34 R |
| 3,364,964 | 1/1968 | Lacey | 144/34 E |
| 3,468,352 | 9/1969 | Larson et al. | 144/34 R |
| 3,498,347 | 3/1970 | Vit | 144/34 R |
| 3,627,004 | 12/1971 | Ramey | 144/34 E |
| 3,638,694 | 1/1972 | Robinson | 144/34 E |
| 3,646,975 | 3/1972 | McNeil, Sr. et al. | 144/34 E |
| 3,814,152 | 6/1974 | Pallari | 144/34 E |
| 3,874,432 | 4/1975 | Albright | 144/3 D |
| 4,046,179 | 9/1977 | Crawford | 144/3 D |
| 4,116,250 | 9/1978 | Ericsson | 144/309 AC |

FOREIGN PATENT DOCUMENTS 670280  6/1979  U.S.S.R. ............................ 144/34 E

Primary Examiner—W. D. Bray
Attorney, Agent, or Firm—Kolisch, Hartwell & Dickinson

[57] ABSTRACT

A substantially planar base plate has a notch therein of a size suitable for receiving tree trunks. The notch has a first and second side, each side being opposite the other. A substantially planar blade has a convex, arc-shaped cutting edge, and is pivotally attached for swinging across the top surface of the plate from the first side of the notch toward the second side so as to slice through a trunk received within the notch. A pair of underbeveled surfaces are located adjacent the notch's second side for undercutting a trunk with respect to the blade so that the trunk leans in the direction of blade swinging during slicing. An hydraulic ram connected to the blade swings it at a preselected slice rate chosen to cause, during slicing, a blade travel speed which has a predetermined relationship to the rate of trunk leaning.

5 Claims, 4 Drawing Figures

SLICING APPARATUS FOR FELLING TREES

BACKGROUND AND SUMMARY OF THE INVENTION

This invention pertains to apparatus for felling trees, and more particularly to such apparatus which fells trees by slicing through a tree trunk with a large blade which is opposed by, and cooperates with, an undercutting device.

In the past, devices have been built which were intended to fell trees, such devices incorporating one or more large motor-driven blades. Typically, such devices were mounted on the front end of a bulldozer or tractor. Also typical, one or more cutting blades extended outwardly from the front of a tractor, and were mounted on some type of support structure. Such blades were placed on opposing sides of a tree trunk while some type of gripping structure, also mounted on the tractor, was clamped on the trunk above blade level. The tree was then sheared off by driving the blade or blades through the trunk. Other similar devices for shearing trees were also used.

A severe problem which exists with the use of such devices is the extreme amount of shattering and crushing of wood in the trunk of a felled tree. Such devices create large shear forces in a tree during cutting. These forces cause the wood in the trunk adjacent the cut to shatter or separate. This problem renders many of the prior art devices commercially unacceptable, due to the fact that a large portion of a felled tree must be cut off before the tree can be utilized by mill operators.

A general object of the present invention is to provide an apparatus and method for felling trees which overcomes the above-stated problems in the prior art.

A preferred embodiment of the invention is mounted on the front of a tractor. A substantially planar base plate extends outwardly from the front of the tractor substantially parallel to the ground. In the base plate, a U-shaped notch, (having opposing first and second sides), suitable for receiving a tree therein, opens toward the front of the plate so that the tractor can approach a tree, and position the notch about such a tree. A substantially planar blade having a convex, arc-shaped cutting edge is pivotally attached to the base plate between the notch and the front of the tractor. In this position, the blade can be pivoted across the notch along a plane superjacent the plane of the base plate, its cutting edge sweeping from the first side of the notch toward the second side thereof. Located adjacent the second side of the notch is a pair of under-beveled surfaces. One of these under-beveled surfaces is formed in the base plate. The other is formed in an anvil which is attached to the under surface of the base plate.

Mounted on support structure for the blade, near the point at which the latter is pivotally attached to the base plate, is a nozzle for spraying lubricant, such as oil. The nozzle is directed toward the cutting surface of the blade. A pump is attached to the base plate between the blade and the front of the tractor. The pump is actuated by a rod which extends from the pump. A feed line connects the pump to the nozzle. Also, an oil supply line is connected to the pump from a source of oil on the tractor. A cam mounted on the rear edge of the blade actuates the pump each time the blade returns to its fully opened position—thus spraying oil from the nozzle onto the blade's cutting surface.

The blade is driven by an hydraulic ram. When a tree is contained within the notch, the ram is actuated, and the blade moves across the notch and through the tree at a predetermined rate of speed. In the instant embodiment of the invention, the blade moves from the first side of the notch toward the second side in approximately five seconds. When the blade begins to move, the under-beveled surfaces are driven into the side of the tree opposite the blade, undercutting the tree with respect to the blade. As the blade cuts slices through the trunk, these surfaces cause the tree to lean in the direction of blade swinging. It is the leaning of the tree with respect to blade travel speed which minimizes crushing and shattering of the fibers within a tree trunk. Too much lean with respect to blade travel speed causes excessive shattering; too little lean with respect to blade travel speed causes increased crushing.

Tests which have been performed on the instant embodiment of the invention reveal that maximum shatter occurs typically only about six inches up the trunk of a tree from the point of a cut. This is true even for frozen trees and for trees which have substantially rotten cores.

Thus, a more specific object of the invention is to provide a method and apparatus which minimizes shatter and crushing of tree fibers by undercutting the tree during slicing, and by providing a predetermined rate of blade travel speed.

Another advantage which is obtained by felling trees with the instant embodiment of the invention is that, due to the effect of undercutting a tree with respect to the blade, the tree always falls in the direction of blade cutting movement.

Thus, another object of the invention is to provide a method and apparatus for felling trees for which the direction of tree fall is predetermined.

These and other objects and advantages attained by the invention will become more fully apparent as the description which follows is read in conjunction with the accompanying drawings.

DETAILED DESCRIPTION OF THE INVENTION

Figures 1, 2:
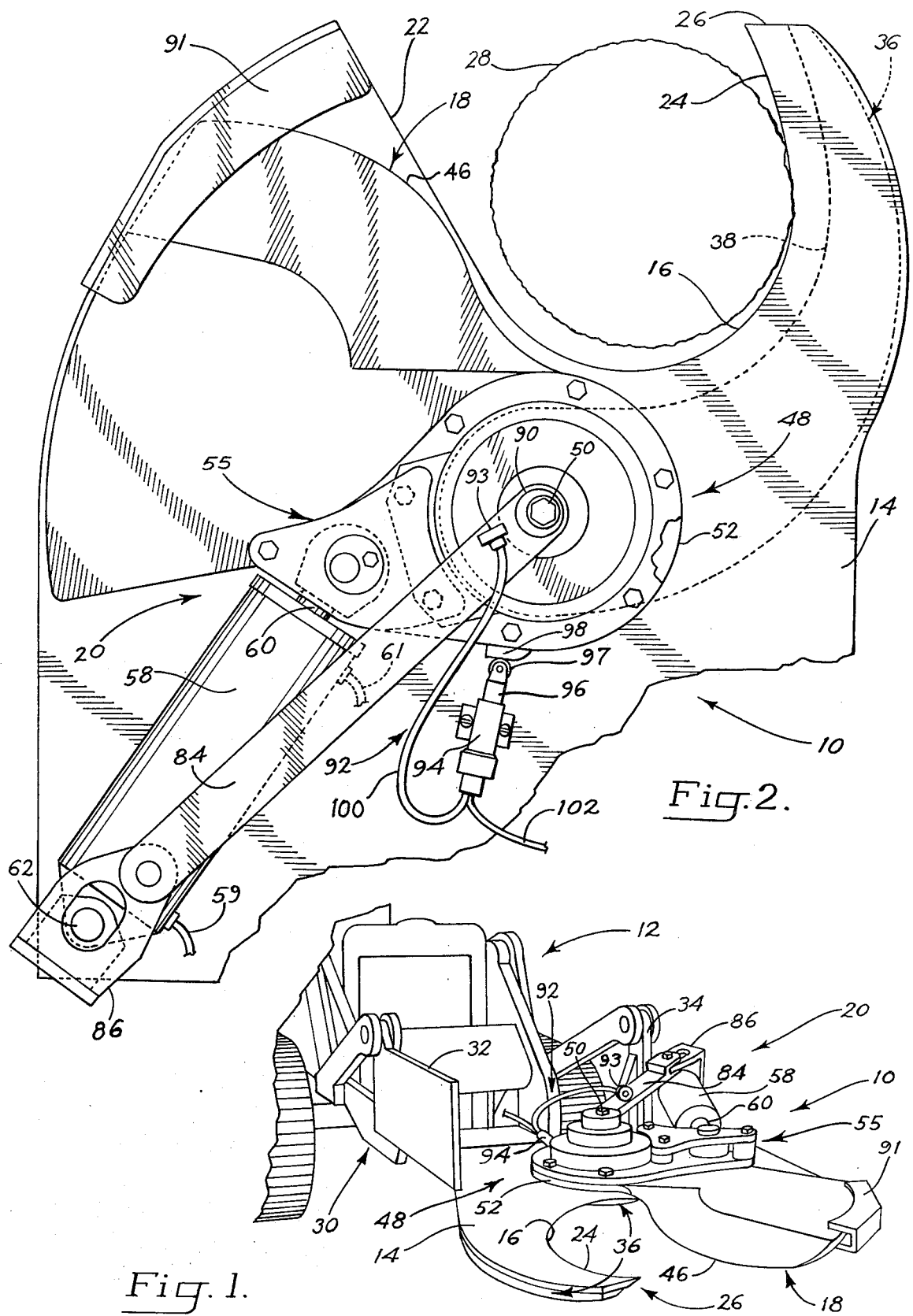
FIG. 1 is a perspective view of a preferred embodiment of the invention mounted on the front of a tractor (shown in partial view).
FIG. 2 is an enlarged cross-sectional view of a tree, and a partial plan view of the apparatus of the invention in position preparatory to slicing the tree.

Turning now to the drawings, and referring first to FIGS. 1 and 2, indicated generally at 10 is a tree-slicing apparatus constructed in accordance with the present invention. Also indicated generally, at 12 (in FIG. 1), is a tractor upon which apparatus 10 is mounted. Included within apparatus 10 are a base plate 14 having a notch 16 therein, a blade 18 which is pivotally attached to plate 14, and a blade drive means, indicated generally at 20. Included within notch 16 are opposing notch sides 22, 24. Disposed on the underside of plate 14 adjacent notch side 24 is what is referred to herein as an undercutting means, as undercutting structure, and as an under-beveled surface means 26.

Generally speaking, slicing and felling of a tree occurs through the interaction thereof with the several parts in apparatus 10 just mentioned above. In particular, felling is accomplished with these parts in the apparatus advanced to place a tree's trunk at a location within notch 16 for tree trunk 28 in FIG. 2.

Still looking at FIGS. 1 and 2, attention is directed to base plate 14. Plate 14 is substantially planar and is composed of a strong metal, preferably steel. An apparatus support frame 30 (see FIG. 1) is suspended from the front of tractor 12. Plate 14 is attached to frame 30 along the rear edge of plate 14 and at vertical supports 32, 34.

Attached to the underside of plate 14 is an anvil 36 having the perimetral outline seen in dashed lines in FIG. 2. Anvil 36 is a solid piece of metal having a thickness, in the instant embodiment of the invention, approximately three times that of plate 14. As can be seen in FIG. 2, anvil 36 includes a convex edge 38 which curves in an offset manner along adjacent notch side 24.

Figure 4:
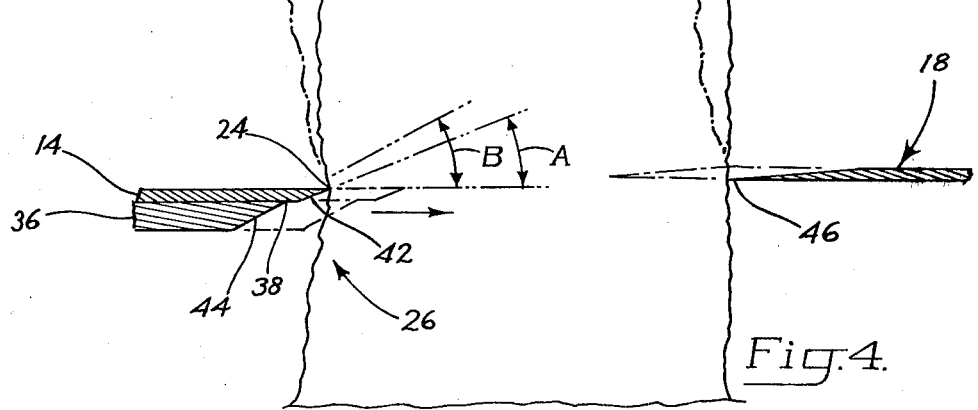
FIG. 4 is a fragmentary simplified front elevation of portions in the apparatus illustrating a slicing operation.

As has been previously mentioned, located adjacent notch side 24 and beneath the surface of plate 14 is undercutting structure 26. Turning now to FIG. 4, undercutting structure 26 includes what are referred to as first and second underbeveled surfaces 42, 44. Surface 42 is formed on the underside of plate 14, and surface 44 is formed on the underside of anvil 36. These surfaces extend adjacent the entirety of notch side 24. The angle formed by surface 42 (angle A) with respect to the top surface of plate 14 is less than the respective angle formed by surface 44 (angle B).

Blade 18 is substantially planar and has a convex arc-shaped cutting edge 46. As can be seen in the cross-sectional view of blade 18 in FIG. 4, cutting edge 46 is tapered.

Returning again to FIGS. 1 and 2, blade 18 is pivotally attached to plate 14 with the lower surface of blade 18 superjacent the top surface of plate 18, the attachment being shown generally at 48. A bolt 50 is located at the center point of attachment 48. A shaft (not visible) extends through concentric holes within anvil 36 and plate 14 and extends upwardly above the surface of plate 14. Bolt 50 is screwed into a threaded bore in the center of the shaft. The shaft is keyed to the anvil and plate so that it will not rotate. Also, blade 18 has an end portion 52 including a central bore which receives the shaft. Included within attachment 48 are conventional load bearings which interact between end portion 52 and the shaft to allow pivotal movement of blade 18 around the shaft. Further, attachment 48 is constructed so that there is approximately 3/16-inch between the lower surface of blade 18 and the top surface of plate 14.

Included within drive means 20 is an hydraulic cylinder 58 and a rod 60. Hoses 59, 61 (in FIG. 2) connect opposite ends of cylinder 58 to a fluid system (not shown) in the tractor which system can supply and exhaust pressure fluid with respect to cylinder 58 upon command from the operator. A crank assembly 55 is fixedly attached to blade 18 adjacent attachment 48. Rod 60 is pivotally attached to crank assembly 55 as shown. A post 62 is fixedly positioned at the rear of cylinder 58 as shown in FIG. 2. Cylinder 58 is pivotally attached to this post.

A thrust restraint bar 84 has one end secured to the previously discussed shaft by bolt 50 through a conventional eccentric tightening device 90. The opposite end of bar 84 is secured to an angle structure 86. Structure 86 is fixedly attached to plate 14, and provides a horizontal extension at the top thereof to which rod 84 is bolted (see particularly FIG. 1).

A blade guard 91 is attached to plate 14 toward the front thereof. Guard 91 provides a protective lip over the edge of blade 18 at the front of apparatus 10.

Finishing now the description of the structure of apparatus 10, indicated generally at 92 is an automatic lubricant or oil dispersal system, or means. Included therein are a nozzle 93, a pump 94, a rod 96, and a rod depressor, or cam, 98. A roller follower 97 for engaging cam 98 is journaled as shown on the outer end of rod 96. Also, an oil delivery line 100 connects pump 94 with nozzle 93. An oil supply line 102 provides oil to pump 94 from the fluid system in tractor 12. Pump 94 operates in a conventional manner, as follows: rod 96 is spring-loaded so that it tends to push outwardly away from pump 94. When the rod 96 moves outwardly, oil is drawn into the pump from the reservoir through line 102. When the rod moves inwardly, oil within the pump is forced through line 100 to nozzle 92, and from there is sprayed onto blade 18.

When apparatus 10 is not in the process of felling a tree, blade 18 is in the stored position shown in FIG. 2. When an appropriately sized tree has been selected for felling, the tractor operator approaches the tree on the vehicle and maneuvers apparatus 10 so as to locate the tree in a position in notch 16 like that shown for tree 28 in FIG. 2. In the instant embodiment of the invention, apparatus 10 is sized to handle easily a 24-inch diameter trunk. However, with such sizing, and for optimum results with respect to the amount of shattering and crushing of fibers in a tree, it is best to limit trunk size to 22-inches in diameter at the level of notch 16.

Once a tree is appropriately positioned as shown in FIG. 2, the operator actuates the pressure fluid system to provide oil under pressure to cylinder 58 through hose 59. The pressure is such, that with a tree contained within notch 16, it takes approximately five seconds for the blade to sweep across the notch from the position shown in FIG. 2 to the position shown in FIG. 3. Of course, when the blade reaches the latter position the tree is sliced through.

Figure 3:
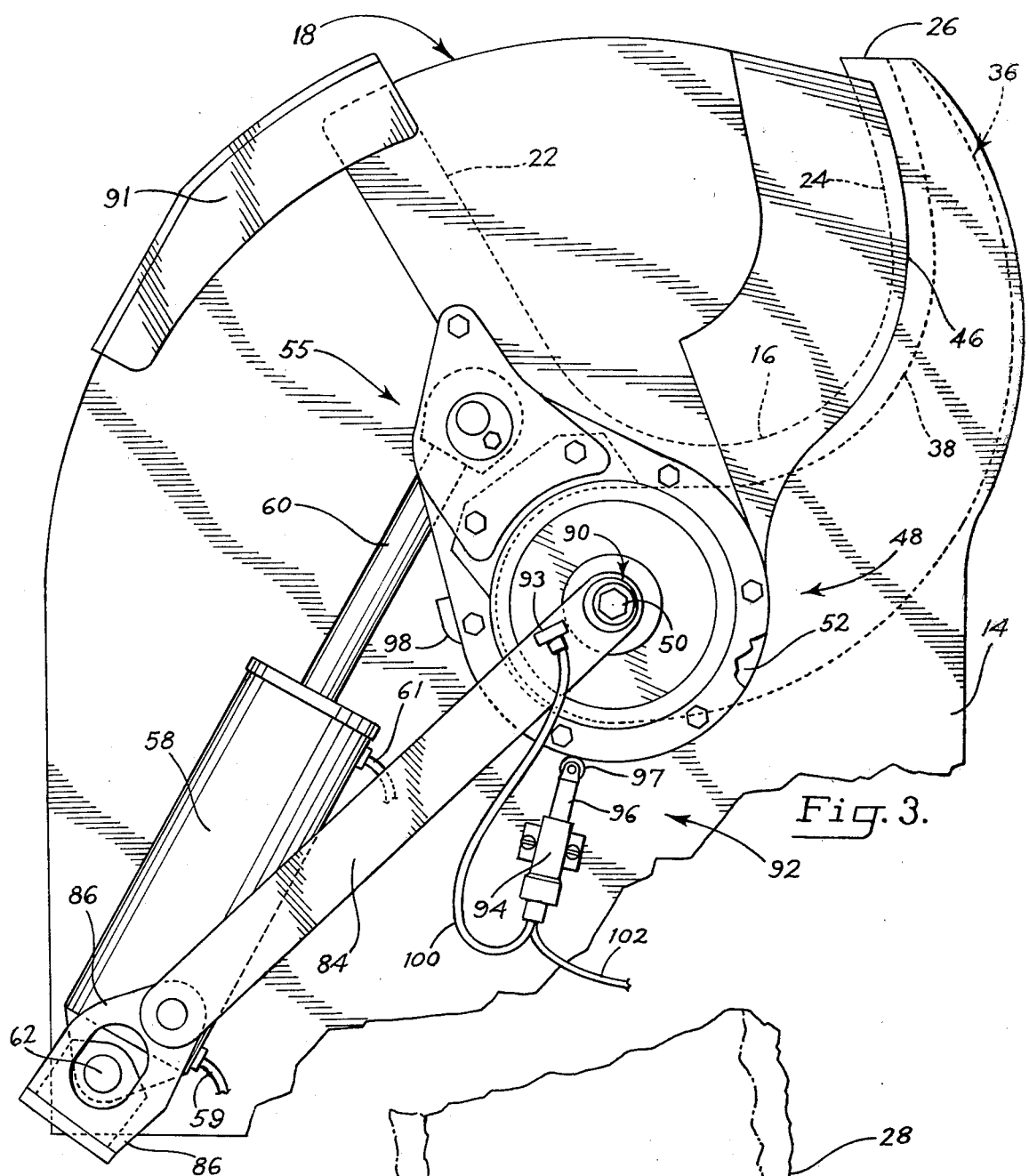
FIG. 3 is similar to FIG. 2, but shows parts in the apparatus in the relative position which they occupy following a slicing operation.

It can be seen by comparing the blade positions in FIGS. 2 and 3, that when the drive system 20 is actuated, the blade is pivoted about the shaft upon which it is mounted. As rod 60 extends, pivoting the blade, crank assembly 55 describes an arcuate path with the previously mentioned shaft forming the center of the arc. Thus, it can be seen that for the drive system to operate in such a manner it is necessary for the end of cylinder 58 to be pivoted on post 62, and, likewise, for rod 60 to be pivoted on the crank assembly. Thus, during the driving of the blade while rod 60 is extending from cylinder 58, pivoting of the cylinder and rod is occurring about post 62 as well as about the crank assembly.

Thrust restraint bar 84 prevents the corner of plate 14 at the location of post 62 from dropping during a slicing process. When rod 60 is extending from cylinder 58, a tremendous amount of force is being directed axially along cylinder 58 toward post 62. Were it not for the presence of bar 84, blade 18 could skew out of its intended travel plane during slicing.

Directing attention now to FIG. 4, blade 18 and undercutting structure 26 are shown in solid lines at the beginning of a slicing process. Further, these components are shown in phantom lines part way through the slicing process. As can be seen, the plane of travel of the lower surface of blade 18 is superjacent the plane of the upper surface of plate 14 in order to permit the travel of blade 18 over plate 14 during completion of a slice.

Once the slicing process begins, the force of blade 18 against the side of the tree opposite undercutting structure 26 tends to cause such structure to imbed into the tree as shown in phantom lines in FIG. 4. Sometimes, this action can cause a slight shifting of the tractor. However, generally, there is enough play within mounting apparatus 30 so that the tractor does not so shift.

As can be seen from the phantom-line views in FIG. 4, as slicing proceeds, tree 28 begins to lean in the direction of blade travel. This is due to the effect of undercutting structure 26 in cooperation with blade movement. As the tree begins to lean, blade 18 can slice through the fibers within the tree as they are gradually exposed. If blade 18 should be traveling at a rate which is too fast compared to the rate of tree lean, the blade tends to crush fibers between the tip of the blade and the under-beveled surfaces. If blade 18 is traveling at a rate too slow compared to the rate of tree lean, shattering tends to occur since fibers are being pulled apart because of the tension placed thereon due to the lean of the tree.

As has been previously mentioned, the instant embodiment of the invention utilizes a blade travel speed of five seconds from the position shown in FIG. 2 to that shown in FIG. 3 while a tree is being sliced. This is controlled by the amount of hydraulic pressure provided via hose 59 to cylinder 58. For the instant embodiment of the invention, five seconds is the optimum rate of blade travel since, either a faster or a slower rate tends to produce more shattering and crushing of the fibers during slicing process.

Directing attention particularly to FIGS. 2 and 3, examination will now be made of the operation of the oil dispersal system. When the slicing process begins and blade 18 starts to travel across notch 16, roller 97 rolls on cam 98 until rod 96 is extended as shown in FIG. 3. As will be recalled, when the rod is extended, a supply of oil is drawn into pump 94 via line 102. After a tree has been felled, blade 18 returns to the position shown in FIG. 2 when the operator actuates the pressure fluid system to provide oil under pressure through line 61 to cylinder 58. When cam 98 reaches roller 97, rod 96 returns to the position shown in FIG. 2. As will be recalled, this has the effect of providing oil under pressure through line 100 to nozzle 93, with oil then onto spraying cutting edge 46 in blade 18. Thus, each time the blade returns to the position shown in FIG. 2, its cutting edge is sprayed in preparation for the next cut to be made. It has been found that oiling the blade greatly assists in the slicing process, and that the hydraulic pressure utilized in cylinder 58 to drive the blade in a slicing stroke may be reduced by 200 to 300 pounds per-square-inch with the blade so oiled. This reduction in pressure further decreases crushing and shattering in a tree.

Thus, a dependable and sturdy apparatus for slicing trees has been shown which results in a minimum amount of damage to a felled tree.

While a preferred embodiment of the invention has been described herein, it is appreciated that other variations and modifications may be made without departing from the spirit of the invention.

It is claimed and desired to secure by letters patent:

1. Slicing apparatus for felling trees having trunk diameters falling within a defined range of diameters, said apparatus, in operative condition, comprising
   a base plate having a substantially planar top surface and a notch therein of a size suitable for tree trunks having diameters within said range, said plate also having on one side of said notch undercutting means subjacent said surface for causing the trunk to lean in the direction of said one side during felling of a tree,
   a substantially planar blade having a convex, arc-shaped cutting edge, pivotally attached to said plate for slicing through a tree trunk received within said notch in a plane superjacent said top surface, and
   drive means drivingly connected to said blade for pivoting the same from a side of said notch opposite said one side toward said one side at a speed related to the rate of tree leaning to produce a cut in the final felled tree characterized substantially solely by sliced fibers.

2. Slicing apparatus for felling trees having trunk diameters falling within a defined range of diameters, said apparatus, in operative condition, comprising,
   a substantially planar base plate having a notch therein of a size suitable for receiving tree trunks having diameters within said range, said notch having opposing sides,
   a substantially planar blade having a convex, arc-shaped cutting edge, pivotally attached for swinging in a plane adjacent the top surface of said plate from a first position, wherein said cutting edge is above said plate adjacent one of said sides, toward a second position, wherein said edge is above said plate adjacent the other side, and said blade covers said notch so as to slice through a trunk received within said notch,
   undercutting means located adjacent the plane of blade swinging on said other side for undercutting such a trunk with respect to said blade so as to cause the trunk to lean in the direction of blade swinging during slicing, said undercutting means including a first under-beveled surface formed in said plate, and a second under-beveled surface formed beneath said plate.

3. The apparatus of claim 2, wherein said first under-beveled surface is inclined at one angle relative to the plane of said plate, and said second under-beveled surface is inclined at another angle relative to said plane, which other angle is greater than said one angle.

4. The apparatus of claims 2 or 3, wherein said first and second surfaces are laterally offset.

5. The apparatus of claim 2 which further includes a solid substantially planar anvil mounted on the bottom surface of said plate, said second under-beveled surface being formed on said anvil.

* * * * *